United States Patent
Aramaki et al.

[11] 3,812,968
[45] May 28, 1974

[54] DEVICE FOR RECOVERING FLOATING MATTER FROM WATER SURFACE

[75] Inventors: Kuninori Aramaki, Yokohama; Hiroshi Kawakami, Kamakura; Yasuharu Kawaguchi, Yokohama, all of Japan

[73] Assignee: Bridgestone Tire Company Limited, Tokyo, Japan

[22] Filed: June 6, 1973

[21] Appl. No.: 367,617

[30] Foreign Application Priority Data
June 10, 1972   Japan.............................. 47-57321
July 26, 1972   Japan.............................. 47-74799

[52] U.S. Cl............. 210/242, 210/83, 210/DIG. 21
[51] Int. Cl............................................. B01d 35/02
[58] Field of Search.......... 210/242, 83, 84, 24, 356

[56]     References Cited
UNITED STATES PATENTS
958,272    5/1910    Nichols............................ 210/83 X
3,700,108  10/1972   Richards.................. 210/DIG. 21 X Primary Examiner—Granville Y. Custer, Jr.
Assistant Examiner—DeWalden W. Jones
Attorney, Agent, or Firm—Sughrue, Rothwell, Mion, Zinn & Macpeak

[57]     ABSTRACT

A ship-like device for recovering pollutant from water surface by forcing the pollutant-carrying water into a downwardly-directed bucket, so that the pollutant floats on calm water surface defined therein and a suction means collects the pollutant therefrom. A whirl-generator may be disposed within the bucket.

7 Claims, 15 Drawing Figures

FIG_1
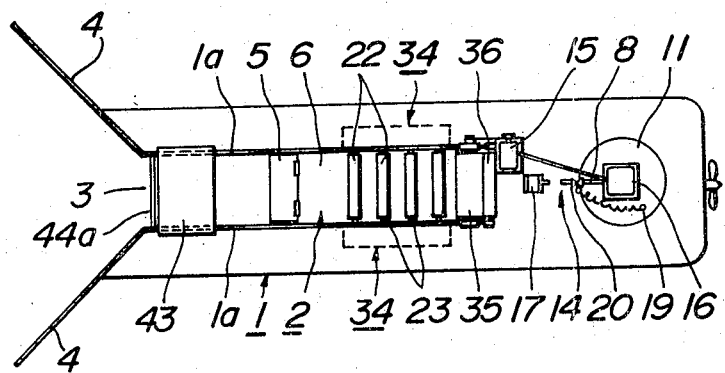
FIG_2
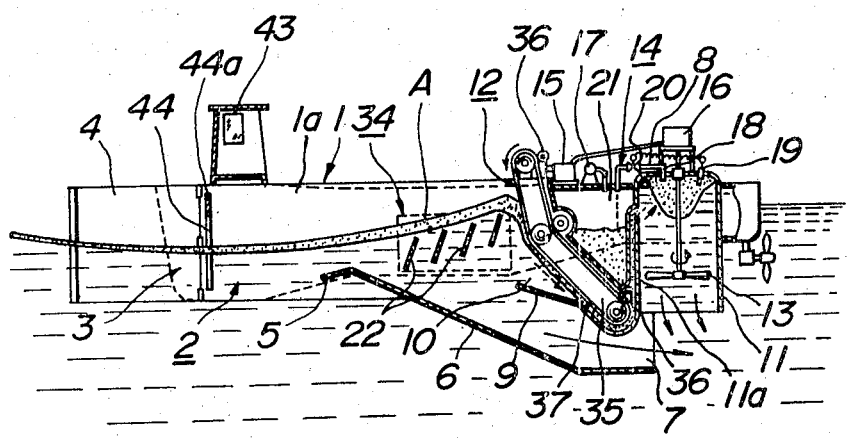

FIG_3
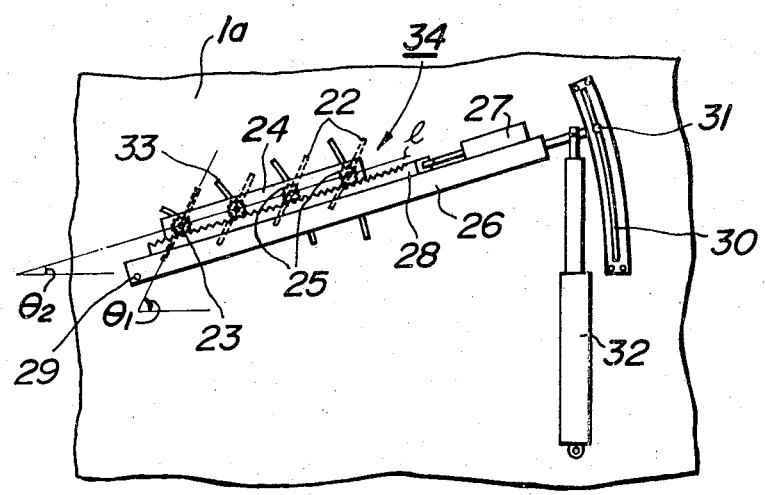
FIG_4
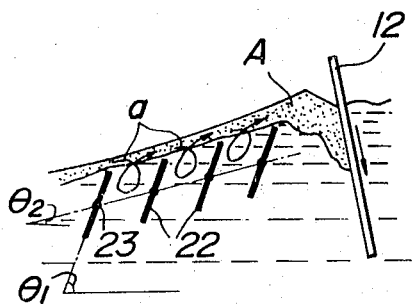
FIG_5
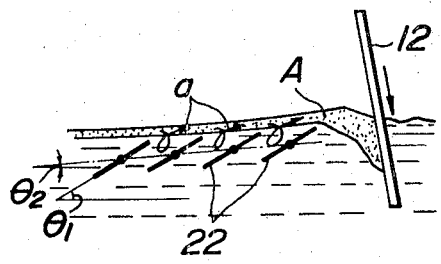

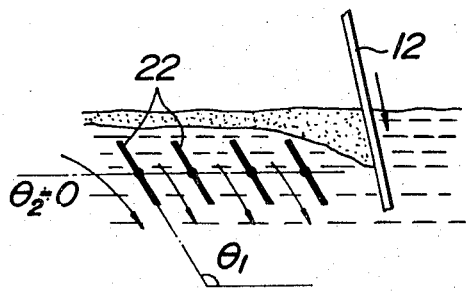
FIG_6
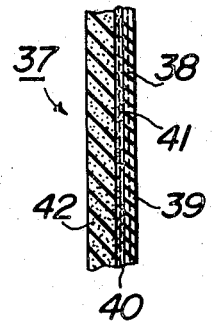
FIG_7
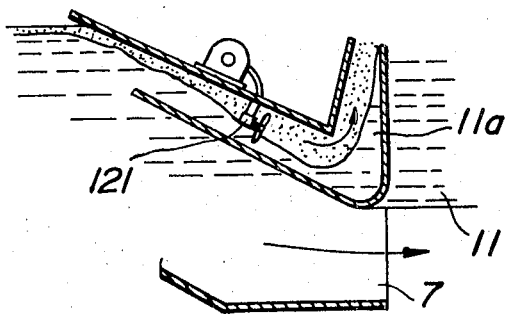
FIG_8
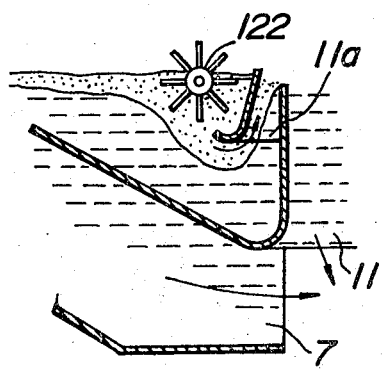
FIG_9

FIG_10
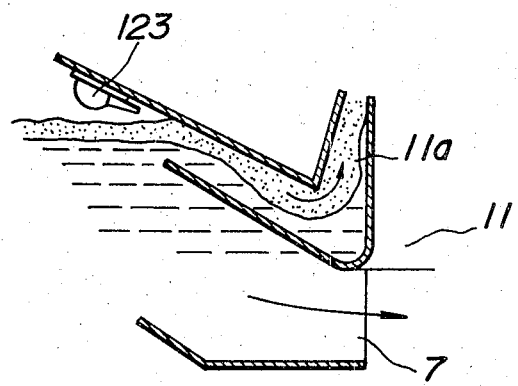
FIG_11
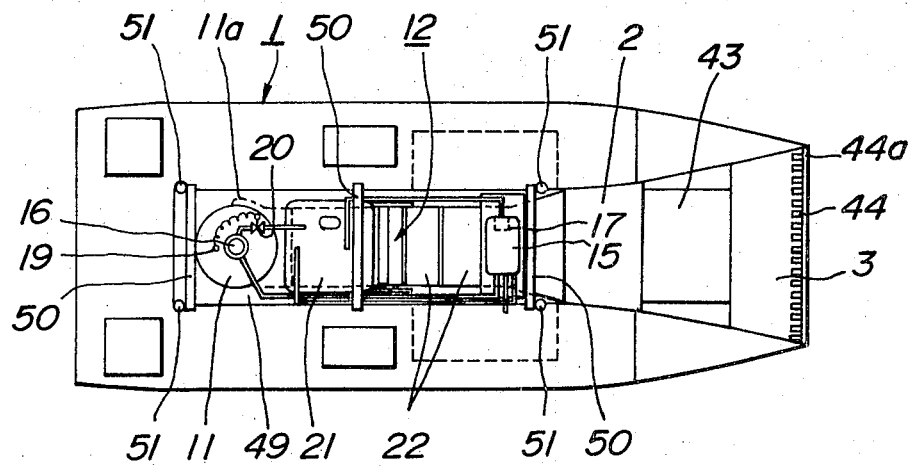

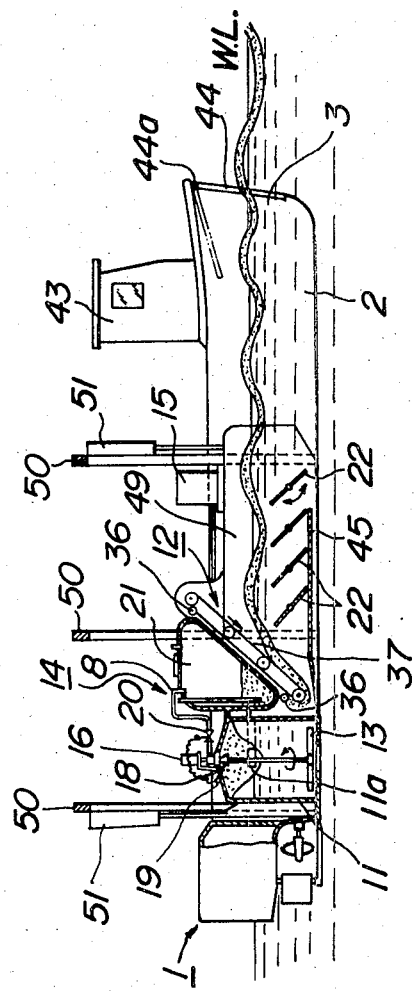

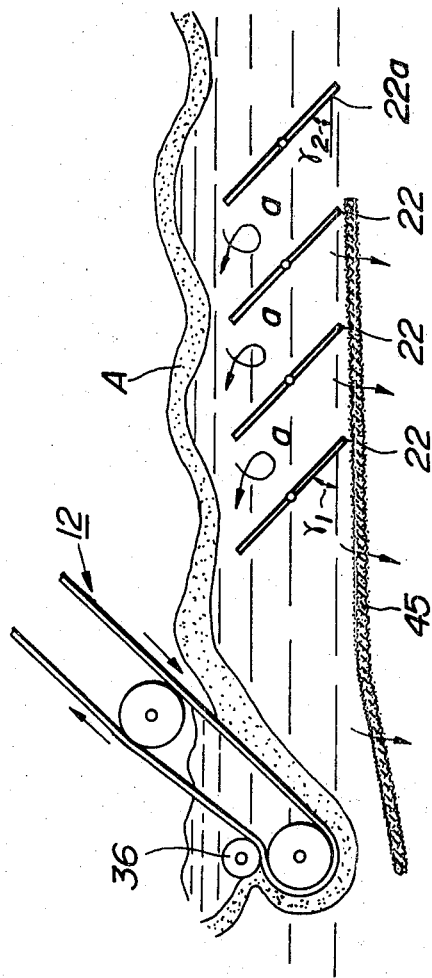

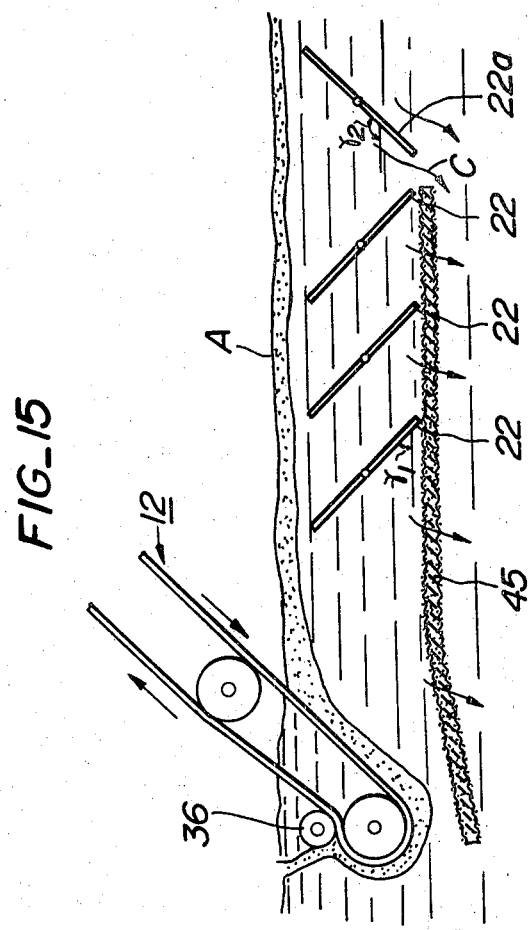

DEVICE FOR RECOVERING FLOATING MATTER FROM WATER SURFACE

BACKGROUND OF THE INVENTION

1. Field of the Invention:

This invention relates to a device for recovering floating matter from water surface, and more particularly to a device for recovering petroleum or the like which is leaked from a tanker or a ship onto water surface.

2. Description of the Prior Art:

Petroleum or the like which is leaked from a tanker or a ship onto water surface is one of major sources of pollutants which cause sea pollution. Although pollutants thus leaked may cause damage on sea life and scenic beauty, there have not been any devices which can effectively remove such pollutants.

For instance, U.S. Pat. No. 3,635,342, which was titled as "METHOD AND APPARATUS FOR RECOVERING A SUBSTANCE FLOATING AS A SHEET ON THE SURFACE OF A LIQUID MASS" and granted on Jan. 18, 1972, to J. C. Mourlon and E. M. R. Dubois, assignors to Bertin & Cie, teaches a method of recovering such pollutants by causing a whirl on water surface about a vertical axis, so as to produce a recess on the water surface to which the pollutants are drawn. By the whirl, moisture content in the pollutants, e.g., spilled petroleum, is reduced, and the pollutants with the reduced moisture content is removed from the water surface. The whirls are, however, susceptible to disturbances caused by waves on the water surface. To avoid the disturbing effects of the waves, Mourlon and Dubois proposed to use a bucket-like fairing for surrounding the whirl. It is difficult to prevent the wave disturbance by a simple fairing, as long as the recovering operation is carried out on the water surface.

Therefore, an object of the present invention is to mitigate the aforesaid difficulty of the conventional pollutant-removing devices.

SUMMARY OF THE INVENTION

According to the present invention, there is provided a device for recovering floating matter from water surface, comprising a floating frame body, a downwardly-directed bucket secured to the frame body and having an inlet opening disposed at a level below the water surface, a feeding means secured to the frame body in the proximity of said bucket, so as to feed the floating matter to the inlet opening of the downwardly-directed bucket, said bucket keeping water comparatively calm therein while causing the floating water to move to top portion of the inside space of the bucket, and a suction means mounted on said frame body for removing the floating matter from the top portion of the bucket.

The water in the downwardly-directed bucket is kept calm, so that fluid in the bucket is free from any disturbance from the outside thereof. As a result, comparatively light matter in the water can be separated therefrom, based on the difference of specific gravities thereof, so that the comparatively light floating matter on the water surface can be sucked by the sucking means for removing it away from the body of water.

For accelerating the separation of the comparatively light matter from the water, a whirl-producing means, such as a propeller-type screw, may be disposed in the downwardly-directed bucket. The whirl-producing means will generate a recess at the central portion of water surface in the bucket, so as to accumulate the floating matter therein.

To improve the efficiency of collecting the floating matter from water, various modifications may be made on the fundamental structure of the device of the invention: for instance, to let the feeding means secured to the floating frame body to generate a water flow toward the downwardly-directed bucket; to provide a guide plate means in the proximity of intake side of said feeding means, for preventing reverse flow of water and enhancing accumulation of the floating matter at the intake side of the feeding means; to form the feeding means with an endless rotary belt means and squeezing rollers, said endless rotary belt carrying adsorptive materials secured to the outer surface thereof, said endless belt means running through a closed path having one end located above the water level and the opposite end thereof located below the water level, said squeezing rollers being located in the proximity of said opposite end of the endless rotary belt so as to cooperate therewith; to form the feeding means with an endless rotary belt of an elastomeric material and a rake-like member which is disposed at such a position that the floating material is caused to flow by the belt and directed to be bucket by the rake-like member; and to provide a wave-stopping filter below said guide plate means, for suppressing the waving of the water in the passage to the downwardly-directed bucket.

When the water carrying floating matter thereon is forced to flow toward the downwardly-directed bucket, accumulation of the floating matter in the passage is accelerated, especially in the case that the floating matter is in the form of a thin layer on the water.

If the guide plate means is disposed in the proximity of the intake side of the feeding means, it will prevent the dispersion and the reverse flow of the floating matter away from the feeding means. Thus, the efficiency of the recovery of the floating matter will be improved.

For feeding the floating matter to the downwardly-directed bucket, the aforesaid endless belt is preferable, because the rotation of the endless belt produces least disturbance, as compared with other feeding means. Whereby, smooth feeding of the floating matters to the bucket is ensured.

When a wave-suppressing filter is disposed below the guide plate means, the floating matter is prevented from escaping from the recovering device by by-passing the passage. The wave-suppressing filter also acts to calm down the water surface, in cooperation with the guide plate means.

BRIEF DESCRIPTION OF THE DRAWING

For a better understanding of the invention, reference is made to the accompanying drawing, in which:

FIG. 1 is a plan view of a device for recovering floating matter from water surface, according to the present invention;

FIG. 2 is a schematic vertical sectional view of the device of FIG. 1;

FIG. 3 is an enlarged side view of a mechanism for controlling inclinations of anti-reverse-flow boards, which is to be incorporated in the device of FIG. 1;

FIGS. 4 to 6 are diagrammatic illustrations of the manner in which the boards of FIG. 3 operate;

FIG. 7 is a partial sectional view of an endless belt for feeding the floating matter to a downwardly-directed bucket;

FIGS. 8 to 10 are schematic sectional views of different mechanisms which can be used for feeding the floating matter to the downwardly-directed bucket;

FIG. 11 is a schematic plan view of another embodiment of the device for recovering floating matter from water surface according to the present invention;

FIG. 12 is a vertical sectional view of the device of FIG. 11;

FIG. 13 is a lateral sectional view of a wave-suppressing filter which can be incorporated in the device of FIG. 12; and FIGS. 14 and 15 are schematic diagrams, illustrating the manner in which the wave-suppressing filter and anti-reverse-flow boards operate.

Like parts are designated by like numerals and like symbols throughout the different figures of the drawing.

DESCRIPTION OF THE PREFERRED EMBODIMENTS

Referring to FIGS. 1 and 2, a device according to the present invention comprises a floating frame body 1, such as a ship, in which a water passage 2 is formed so as to cause a water flow into the ship 1 as the latter cruises on the water surface. For simplicity, the floating frame body 1 is described as a ship in the following, but it should be understood that the floating frame body 1 is not restricted to a ship. With the water passage 2, a U-shaped front portion is formed in the ship 1. The water passage 2 has an inlet opening 3 at the leading end of the ship, and a pair of vertical plates 4, 4 are swingably secured to the ship at the inlet opening 3 of the passage 2, so as to constitute a guide plate means for guiding the floating matter and the water into the passage 2 when the ship 1 cruises.

More particularly, when the ship 1 is under operation for recovery of the floating matter, the plates 4, 4 assume the positions as shown in FIGS. 1 and 2, for maximizing the amount of the floating matter to be recovered by the device. On the other hand, when the ship is not under operation, the plates 4, 4 are swung to such positions that they will not cause any significant resistance to the cruising of the ship.

A strainer or screen 44 is disposed at the inlet opening 3 of the passage 2, for preventing foreign matters from entering the passage 2 together with the floating matter A. The floating matter A is, for instance, spilled petroleum. In the embodiment of FIGS. 1 and 2, the screen 44 is of comb type and comprises a horizontal shaft 44a and teeth members secured thereto. When the ship 1 is not operating for recovery, the strainer or screen 44 is raised above the water surface, so as to minimize the resistance to the cruising.

A horizontal guide plate 5 is connected a bottom wall 6 of the passage 2, so as to be swingable about a horizontal axis. The horizontal guide plate 5 acts to prevent the floating matter A from by-passing the recovering device by flowing underneath the bottom plate 6.

The ship 1 has a pair of side walls 1a, between which the passage 2 is defined. Each of the side walls 1a should extend above the water level W. L. by a distance which is long enough for inhibiting the overflow of the water in the passage 2 to the water outside the ship 1 across the ship wall. The bottom plate 6 extends along the lower edges of the sidewall 1a, so as to extend away from the water level W.L. as it extends toward the rear end of the ship 1. Whereby, the water entering into the passage 2 from the front end of the ship 1 is discharged through an outlet opening 7 located at the rear bottom end of the ship 1.

During the operation, as the ship moves forward, water enters into the ship 1 through the passage 2 in the aforesaid manner, and the device of the invention is to recover the floating matter A, such as petroleum, before the water leaves the ship 2. To this end, a recovery passage 10 is formed at the rear portion of the water passage 2, by providing a partition wall 9 therein, as shown in FIG. 1. The recovery passage 10 leads the top portion of the water in the passage 2, which carries the floating matter A, to the inlet opening 11a of a separator tank or a downwardly-directed bucket 11 secured to the rear end of the ship 1. The inlet opening 11a is located below the water level W.L. for allowing smooth water flow thereto. According to the present invention, a feeding means 12 is disposed in the recovery passage 10 so as to force the floating matter A to flow into the downwardly-directed bucket 11.

The downwardly-directed bucket 11 includes a whirl-generator 13 which is located at the central portion thereof, as shown in FIG. 2. In this example, the whirl-generator is of propeller type. The floating matter A which is fed into the bucket 11 is forced to circulate in the bucket 11 by the whirl-generating means 13. As a result, the floating matter A is accumulated in the top central portion of the water in the bucket 11, as shown in FIG. 2. Any excess water in the bucket 11 is continuously discharged to the outside of the ship through the open lower end of the bucket 11, as shown by the arrows of the figure. A suction means 14 is operatively connected to the top portion of the bucket 11, so as to separate the floating matter A from the water in the bucket 11 and to deliver the comparatively moisture-free floating matter A to a storage tank 21. The whirl-generator 13 is driven by an air motor 16 whichis connected to an air compressor 15, in the case of the embodiment, as illustrated in FIGS. 1 and 2. The type of the whirl-generator and its driving mechanism are, however, not restricted to those as illustrated in the drawings and a whirl-generator of other type may be used in the device of the invention together with a suitable driving unit thereof, as far as the aforesaid accumulation of the floating matter A is ensured.

Referring to FIGS. 1 and 2, the suction unit 14 may be constituted by using a pump 17 and a suction nozzle 18, and the suction nozzle 18 communicates with the storage tank 21 through a suitable conduit 8. To establish effective communication between the nozzle 18 and the tank 21 only when a sufficient amount of the floating matter A is accumulated at the top inside portion of the bucket 11, a level detector 19, e.g., an oil detector, is disposed at the top portion of the bucket 11, and a solenoid valve 20 to be controlled by the detector 19 is mounted on the conduit 8.

With the downwardly-directed bucket 11 according to the present invention, both the floating matter A and the water therein are completely separated from the outside air. The air which is initially filling the bucket 11 is automatically removed therefrom by the suction unit 14. Whereby, the water surface in the bucket 11 is kept free from outside disturbances, so as to enable stable separation of the floating matter from the water.

In the embodiment, as illustrated in FIGS. 1 and 2, the top portion of the bucket 11 extends above the water level W.L., but the watertight construction of the bucket 11 allows the filling of the upper portion thereof with water and the floating matter A, as long as the air is removed therefrom by the suction unit 14.

A plurality of anti-reverse-flow boards 22 are disposed in the passage 2 with suitable intervals therebetween, for the purpose of preventing the water and floating matter A from flowing in the reverse direction so as to accumulate as much floating matter A as possible in front of the feeding means 12. Thus, the boards 22 are disposed at the rear portion of the passage 2, relative to the cruising direction of the ship 1, in the proximity of the feeding means 12. Each of the boards 22 extends across the entire width of the passage 2, as taken at right angles to the cruising direction of the ship 1. Preferably, the inclination $\theta_1$ of each anti-reverse-flow board 22, relative to the horizontal, is controllable so as to selectively assume a suitable inclination. To this end, each board 22 has a horizontal shaft 23 about which the board 22 may swing.

Referring to FIGS. 4 to 6, the horizontal shafts 23 of all the anti-reverse-flow boards 22 should preferably lie on a single plane, so as to define a line $l$ which intersects all the horizontal shafts 23 at right angles thereto. The inclination $\theta_2$ of this line $l$, relative to the horizontal direction, should also be made variable.

FIG. 3 illustrates an example of angle control unit 34 for regulating the aforesaid inclination angles $\theta_1$ and $\theta_2$. Each horizontal shaft 23 is rotatably held by suitable support members 24 at opposite ends thereof. A pinion 25 is integrally fixed to the horizontal shaft 23 at one end thereof. If desired, a similar pinion 25 may be secured to the opposite end of the horizontal shaft 23. The pinions 25 of the horizontal shafts 23 engage a common rack 28, which is slidably carried by a guide bar 26. A suitable rack-driving means 27, e.g., a hydraulic cylinder, is mounted on the guide bar 26, so as to selectively move the rack 28 on the bar 26. As apparent from FIG. 3, the inclination $\theta_1$ of the individual anti-reverse-flow boards 22 can be controlled by selectively actuating the rack-driving means 27. In the embodiment of FIG. 3, all the boards 22 are simultaneously rotated, by the engagement of the pinions 25 and the rack 28.

One end of the guide bar 26 is pivotally connected to a support bolt 29 which is carried by a part of the sidewall 1a. A projection 31 is connected to the opposite end of the guide bar 26, which projection 31 slidably fits in an arcuate guide slot 30, as shown in FIG. 3. A hydraulic cylinder 32 is connected to the sidewall 1a, which cylinder 32 has a driven piston whose free end is connected to the guide bar 26 in the proximity of the aforesaid projection 31. Thus, upon actuation of the hydraulic cylinder 32, the guide bar 26 swings vertically about the support bolt 29, together with the anti-reverse-flow boards 22, the support member 24, the rack 28, and the rack-driving means 27. Thus, the inclination $\theta_2$ of the line $l$, which perpendicularly intersects all the horizontal shafts 23 of the anti-reverse-flow boards 22, can be controlled by selectively actuating the hydraulic cylinder 32. The sidewall 1a has a plurality of arcuate guide slots 33, which slidingly guide the movement of the horizontal shafts 23 in response to the actuation of the hydraulic cylinder 32. The aforesaid angle control unit 34 may be mounted on one side of the passage 2 or on both sides thereof.

When the water surface is wavy and comparatively high waves are caused in the passage 2 of the ship 1, large inclinations $\theta_1$ and $\theta_2$ are given to the anti-reverse-flow boards 22 by the hydraulic cylinder 32 and the driving means 27, as shown in FIG. 4. On the contrary, when the water in the passage 2 is calm, comparatively small inclinations $\theta_1$ and $\theta_2$ are given, as shown in FIG. 5. In other words, the inclinations $\theta_1$ and $\theta_2$ of the anti-reverse-flow boards 22 are so selected that the floating matter A is always kept above the top edges of the boards 22. The boards 22 thus disposed act to prevent reverse flow of the floating matter A along the inclined surface of the waves in the passage 2. The boards 22 also act to prevent the reverse flow of the floating matter A even when a turbulence is caused in the floating matter A in the passage 2, or in the proximity of the feeding means 12. Sometimes, a part of the floating matter A may be forced into spaces between adjacent anti-reverse-flow boards 22 by waves or other turbulence, but such parts of the floating matter A are returned toward the feeding means 12, as shown by the arrows $a$ of FIGS. 4 and 5. In short, the anti-reverse-flow boards 22 act to accumulate the floating matter A at a space which is immediately in front of the feeding means 12.

When the water in the passage 2 is very calm, the inclination $\theta_2$ of the line $l$ of the anti-reverse-flow boards 22 is kept zero, while the inclination $\theta_1$ of the individual boards 22 is set at an obtuse angle, as shown in FIG. 6. In this case, the boards 22 act as guide plates or constitute a strainer for passing the water downwardly while allowing the formation of a comparatively thick layer of the floating matter A above the boards, as shown in the figure.

The feeding means 12 acts to forcibly deliver the floating matter A from that part of the passage 2 which is in front of the means 12 to the downwardly-directed bucket 11 through the recovery passage 10. For instance, the feeding means 12 may be made of an endless belt unit 35 driven by a motor or the like and a plurality of squeezing rollers 36 engaging the endless belt unit 35, a part of which endless belt unit 35 extends above the water level W.L. The endless belt means 35 may be lined with a layer of adsorptive material, such as polyurethane foam or tufted fabric. In the embodiment, as illustrated in FIGS. 1 and 2, the endless belt unit 35 has a width which is almost as wide as the width of the passage 2, and the squeezing rollers engage the belt unit 35 on the side facing the bucket 11. The lower end of the endless belt unit 35 extends along the recovery passage 10 to the proximity of the inlet opening 11a of the bucket 11. One of the squeezing rollers 36 engages the endless belt unit 35 in the proximity of the inlet opening 11a of the bucket 11, so as to squeeze out the floating matter A adsorbed in the belt unit 35. The floating matter A which is squeezed out by the lower squeezing roller 36 is forced into the bucket 11 through the inlet opening 11a thereof by the buoyancy acting thereon and by the water flow caused by the cruising of the ship 1.

FIG. 7 illustrates a sectional view of a preferred embodiment of the endless belt members 37 which is usable in the endless belt unit 35. The belt member 37 comprises a base belt 39 reinforced by a canvas layer 38 or the like, an adhesive layer 40 secured to the base belt and having another reinforcing layer 41 made of a canvas layer or the like, and a polyurethane foam layer 42 secured to the adhesive layer 40. The belt member 37 can effectively adsorb the floating matter A in the water and carries it to a position where it is squeezed out from it.

The inventors also found that the endless belt unit 35 can be comprised of an endless belt made of a suitable elastomer and a rake-like member, in which the elastomer belt travels along a closed path just like the endless belt member 37 of FIG. 2 and the rake-like member is located at the same position as the lowermost roller 36 of FIG. 2. Thereby, the elastomer belt causes the water and the floating matter A to flow along the surface thereof in the recovery passage 10, and the rake-like member acts to divert such flow of the water and the floating matter A toward the inlet opening 11a of the downwardly-directed bucket 11. In this case, it is not necessary to apply any adsorptive layer on the endless belt.

In the embodiment of FIG. 2, that portion of the endless belt unit 35 which extends above the water level W.L. is kept substantially vertical, but it is also possible to incline that portion forwardly or backwardly, relative to the cruising direction of the ship 1. The inclination of the adsorptive surface of the endless belt unit 35, relative to the horizontal, may be controlled in proper relation with the roughness or calmness of the water in the passage 2, for optimizing the adsorption of the floating matter A thereby.

The structure of the feeding means 12 is not restricted to the endless belt unit 35. For instance it can be formed of a screw 121, as shown in FIG. 8, a rotary water wheel 122, as shown in FIG. 9, or a jet nozzle 123, as shown in FIG. 10.

FIGS. 11 to 15 illustrate another embodiment of the device for recovering floating matter from water surface, according to the present invention, in which a wave-suppressing filter is used. Referring to the figures, a wave-suppressing filter 45 extends across the space between the sidewalls 1a of a passage 2, so as to form a bottom wall thereof below a group of anti-reverse-flow boards 22. In this embodiment, no bottom flow guide wall, as referred to by a numeral 6 in FIG. 2, is used. The wave-suppressing filter 45 is to prevent the floating matter A from leaking to the outside of a ship 1 through the bottom thereof at the time of turbulence in the water at the passage 2 of the ship. Thus, the wave-suppressing filter 45 is required to allow passage of water therethrough, while inhibiting the passage of the floating matter A from passing therethrough.

FIG. 13 illustrates a sectional view of a typical example of the wave-suppressing filter 45. The filter 45 comprises a mounting frame 46 which is made of channel members, and opposing surfaces of the frame 46 is covered with metallic screens 48. Foamed material 47, such as polyurethane foam, is stuffed in the space between the two metallic screens 48 and surrounded by the channel members of the frame 46.

The embodiment, as illustrated in FIGS. 11 and 12, also uses a plurality of anti-reverse-flow boards 22, which are disposed in the water passage 2 of the ship 1, so as to prevent the reverse flow in the passage 2 and to accumulate a large amount of the floating matter A in the proximity of a feeding means 12. To this end, each of the anti-reverse-flow boards 22 extends across the full width of the passage at right angles to the cruising direction of the ship, while keeping suitable intervals between adjacent boards 22.

Referring to FIGS. 14 and 15, the anti-reverse-flow board 22 are disposed in such a manner that the front edge of each board 22, relative to the cruising direction of the ship, is normally kept at a level which is lower than that of the trailing edge of the board. In the case of this embodiment, the preferable inclination $\gamma_1$ of each board 22 is found to be about 45°. The foremost board 22a of the group of the anti-reverse-flow boards 22 is made swingable by a suitable means, e.g., by a hydraulic cylinder (not shown), so that the inclination $\gamma_2$ of the foremost board 22a is controllable at a desired value. When the water in the passage 2 is turbulent and wavy, the inclination $\gamma_2$ of the foremost board 22a is set at about 45°, as shown in FIG. 14. On the other hand, when the water in the passage 2 is comparatively calm, the inclination of the foremost board 22a is preferably set at about 135°, as shown in FIG. 15. More particularly, when the passage 2 is calm, the foremost board 22a acts as a guide of water stream, so as to smoothly deliver the water stream in the passage 2 to the outside of the ship 1, as shown by the arrow c of FIG. 15. Whereby, the thickness of the top layer of the floating matter A can be increased, for improving the overall efficiency of its recovery.

The top edges of the anti-reverse-flow boards 22 should be kept below the level of the lowermost valley of waved surface of the water in the passage 2, regardless of the surface conditions. Thus, the boards 22 should preferably be mounted on the ship 1 in a movable fashion.

In the embodiment, as illustrated in FIGS. 11 and 12, the major elements of the device for recovering the floating matter are separately assembled and mounted on the ship 1 in a replaceable manner. More particularly, the major parts including the downwardly-directed bucket 11, the feeding means 12, the storage tank 21, the anti-reverse-flow boards 22, and the wave-suppressing filter 45 are assembled in a framework 49. The framework 49 includes a passage which snugly fits in the passage 2 of the ship 1. The framework 49 is mounted on gate members 50 of the ship 1, and fixed thereto by hydraulic cylinders 51 in a vertically reciprocable manner. When the ship 1 is cruising without performing any recovery of the floating matter A, the framework 49 is raised to its uppermost position, by the hydraulic cylinders 51, so as to minimize the fluid resistance against the cruising. To start the recovery of the floating matter A, the framework 49 is lowered to a position where the anti-reverse-flow boards 22 are placed at levels which are suitable for the recovering operation under given calmness condition of the water. It is, of course, possible to incorporate the angle control unit 34 of FIG. 3 in the embodiment of FIGS. 11 and 12, for facilitating the positioning of the anti-reverse-flow boards 22.

Referring to FIGS. 11 and 12, the floating matter A is preferably fed into the downwardly-directed bucket 11 in the peripheral direction of the tank, or substantially in the tangential direction to a horizontal circle about the vertical central axis of the tank. To this end, a curved conduit may be provided between the lower end of the endless belt unit 35 and the inlet opening 11a of the bucket 11, as shown by the dotted lines in the figures. When a whirl-generator 13 is used in the bucket 11, the floating matter A should preferably be fed to the bucket in the same direction as that of the fluid circulation therein which is caused by the generator 13.

FIGS. 14 and 15 illustrate the manner in which the anti-reverse-flow boards 22 and the wave-suppressing filter 45 of the embodiment of FIGS. 11 and 12 operate. As pointed out above, the boards 22 are for preventing the floating matter A from flowing away from the feeding means 12 even when the wave surface is so sloped as to induce such flow, and thereby for accumulating the floating matter A in front of the feeding means 12 by preventing its reverse flow relative to the cruising direction of the ship 1. Should a part of the floating matter A move into spaces between the boards 22, the wave-suppressing filter 45 of the aforesaid construction inhibits the passage of the floating matter A therethrough, so that the floating matter A is forced to turn around and to return to the feeding means 12, as shown by the arrows $a$ of FIG. 14. The wave-suppressing filter 45 also acts as a damper which suppress the turbulence in the passage 2 by allowing water passage therethrough. Whereby, the water and the floating matter A smoothly flow in the vicinity of the feeding means 12 without causing any violent turbulence.

When the pollutant recovering device of the present invention is constructed in the form of a ship, a control cabin 43 may be provided therein for facilitating the efficient control of the device, as shown in FIGS. 1 and 11.

We claim:

1. A device for recovering floating matter from water surface, comprising a floating frame body, a downwardly-directed bucket secured to the frame body and having an inlet opening disposed at a level below the water surface, a feeding means secured to the frame body in the proximity of said bucket, so as to feed the floating matter to the inlet opening of the downwardly-directed bucket, said bucket keeping water comparatively calm therein while causing the floating matter to move to top portion of the inside space of the bucket, and a suction means mounted on said frame body for removing the floating matter from the top portion of the bucket.

2. A device for recovering floating matter according to claim 1 and further comprising a whirl-generating means which is disposed in said bucket.

3. A device for recovering floating matter according to claim 1 and further comprising a passage which is formed within said floating frame and has an opening communicating with outside water and another opening communicating with said bucket, wherein said feeding means is disposed within said passage.

4. A device for recovering floating matter according to claim 3 and further comprising a plurality of anti-reverse-flow boards which are disposed in said passage in parallel with each other below water level therein, each of said boards extends at right angles to direction of water flow toward said bucket.

5. A device according to claim 3, wherein said feeding means consists of an endless belt having an adsorptive member secured to outer surface thereof, a driving means causing rotation of said endless belt, and at least one squeezing roller engaging said endless belt, said endless belt moving along a closed loop extending from a point above water level to the proximity of said inlet opening of said bucket.

6. A device for recovering floating matter according to claim 4 and further comprising a wave-suppressing filter which is disposed at bottom portion of said passage and allows passage of water therethrough but inhibits passage of said floating matter therethrough.

7. A device according to claim 3, wherein said feeding means consists of an endless belt made of an elastomer, a driving means causing rotation of said endless belt so as to produce a flow of water and the floating matter along the outer surface thereof, and at least one rake-like member which faces said endless belt in such a manner that the flow caused by the endless belt is diverted toward the downwardly-directed bucket.

* * * * *